United States Patent [19]
Akutagawa et al.

[11] 3,914,289
[45] Oct. 21, 1975

[54] PROCESS FOR PREPARING 2-ACETYL-5-METHYL-4-HEXENIC ACID ESTERS

[75] Inventors: Susumu Akutagawa, Tokyo; Hidenori Kumobayashi, Kanagawa; Akira Komatsu, Tokyo, all of Japan

[73] Assignee: Takasago Perfumery Co., Ltd., Tokyo, Japan

[22] Filed: Oct. 4, 1973

[21] Appl. No.: 403,361

[30] Foreign Application Priority Data
Oct. 5, 1972 Japan.............................. 47-100180

[52] U.S. Cl................................. 260/483; 260/595
[51] Int. Cl.$^2$........................................ G07C 67/30
[58] Field of Search..................................... 260/483

[56] References Cited
UNITED STATES PATENTS
3,723,500   3/1973   Coulson.............................. 260/483

*Primary Examiner*—Vivian Garner
*Attorney, Agent, or Firm*—Sughrue, Rothwell, Mion, Zinn & Macpeak

[57] ABSTRACT

A process for preparing 2-acetyl-5-methyl-4-hexenic acid esters by reacting isoprene with acetoacetic acid esters in the presence of, as a catalyst, a zero-valent palladium-phosphorene complex such as tetrakis(1-ethyl-3-methyl-3-phosphorene).palladium. These hexenic acid esters can be converted to methyl heptenone by decarboxylation which is useful as material for the synthesis of terpene compounds.

11 Claims, No Drawings

PROCESS FOR PREPARING 2-ACETYL-5-METHYL-4-HEXENIC ACID ESTERS

BACKGROUND OF THE INVENTION

1. FIELD OF THE INVENTION

This invention relates to a process for preparing 2-acetyl-5-methyl-4-hexenic acid esters (III) (to be abbreviated herein to prenylacetoacetic acid ester), and more specifically to a process for preparing prenylacetoacetic acid esters selectively by reacting isoprene (I) with an acetoacetic acid ester (II) using as a catalyst a zero-valent palladium-phosphorene complex.

2. DESCRIPTION OF THE PRIOR ART

Previously, Bulletin of the Chemical Society of Japan, Vol. 45, pages 1183 – 1191 (1972), for example, disclosed a method of synthesizing prenyl acetoacetic acid esters or prenyl malonic acid esters by catalytically reacting isoprene with acetoacetic acid esters or malonic acid esters. This method, however, suffers from the disadvantage that where isoprene is reacted with an acetoacetic acid ester, compounds of the formulae (V), (VI) and (VII) shown below are formed concurrently, and the intended prenyl acetoacetic acid ester (III) cannot be obtained selectively.

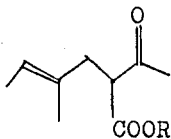
(V)

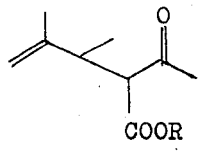
(VI)

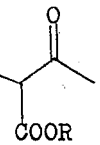
(VII)

Various investigations of the inventors with a view to removing this defect led to the discovery of a catalyst capable of providing the prenyl acetoacetic acid esters (III) selectively, and therefore, to the accomplishment of an industrially advantageous process for producing methyl heptenone which is useful as a starting material in the synthesis of terpene compounds.

SUMMARY OF THE INVENTION

This invention provides a process for preparing 2-acetyl-5-methyl-4-hexenic acid esters of the general formula (III)

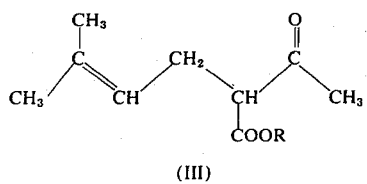
(III)

by reacting isoprene (I) with an acetoacetic acid ester having the general formula (II)

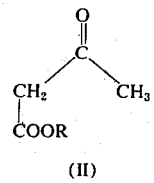
(II)

using as a catalyst a zero-valent palladium complex comprising phosphorenes and being represented by the general formula

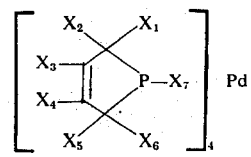

wherein each of $X_1$ to $X_6$ is a hydrogen atom or an alkyl group having 1 to 5 carbon atoms such as methyl or ethyl, an alkenyl group having 1 to 6 carbon atoms such as 4-methyl-3-pentenyl, or an aryl group such as phenyl; $X_7$ is an alkyl group having 1 to 5 carbon atoms such as methyl or ethyl, an alkenyl group having 1 to 5 carbon atoms such as allyl or methallyl, an aryl group such as phenyl or para-tolyl, an alkoxy group having 1 to 5 carbon atoms such as ethoxy or butoxy, a phenoxy group or an amino group such as dimethylamino, diethylamino or diphenylamino, and wherein the four phosphorene compounds may be the same or different.

Representative compounds within the above general formula are tetrakis(1-ethyl-3-methyl-3-phosphorene) palladium, tetrakis(1-methyl-3-methyl-3-phosphorene) palladium, tetrakis[1-phenyl-4-(4-methyl-3-pentenyl)-3-phosphorene] palladium, tetrakis(1-phenyl-3-methyl-3-phosphorene) palladium, tetrakis(1-phenyl-2-phenyl-3-phosphorene) palladium, tetrakis(1-phenoxy-2-methyl-3-phosphorene) palladium, tetrakis-(1-dimethylamino-3-methyl-3-phosphorene) palladium, and (1-methyl-3-methyl-3-phosphorene)$_2$.(1-ethoxy-3-methyl-3-phosphorene)$_2$ palladium.

The process of this invention is shown by the following reaction schematic.

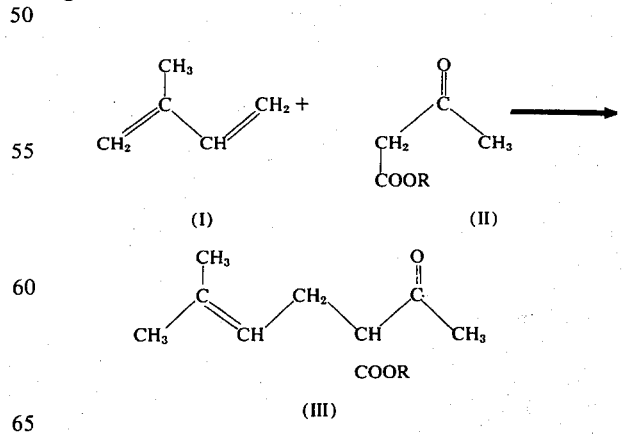

wherein R is lower alkyl group such as methyl or ethyl.

The prenylacetoacetic acid ester (III) can be converted to methyl heptenone of the formula (IV) below by decarboxylation as described by Ruzicka, Helv. Chim. Acta, 2, 182 (1919).

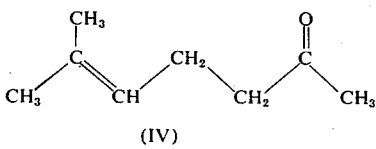

(IV)

Methyl heptenone is important as a material for the synthesis of terpene compounds as reported by Ruzicka, ibid. Accordingly, this invention provides a novel and advantageous process for the synthesis of methyl heptenone which has been the subject of much prior research.

DETAILED DESCRIPTION OF THE INVENTION

The phosphorene compound used in this invention is prepared by reacting a conjugated diene compound with phosphorus tribromide to form a 1-bromophosphorene compound, and then causing a Grignard reagent to act on it, in accordance with the methods described in Tetrahedron, vol. 19, page 1563 (1963) and Journal of the American Chemical Society, vol. 92, page 5779 (1970).

The zero-valent complex of palladium comprising the phosphorene used as the catalyst is prepared in accordance with the general procedures disclosed in L. Malatesta and M. Angoletta, "Palladium (O) Compounds", Journal of the Chemical Society 1186 (1957); and E. O. Fischer and H. Werner, "Zur Komplexchemie des Palladium (O)", Chemische Berichte 75, 703 (1962).

The process of this invention is carried out by dissolving the catalyst, the isoprene and the acetoacetic acid ester in a solvent in an inert gas atmosphere such as nitrogen atmosphere or an argon atmosphere, and heating the solution for the period specified below. The molar ratio of catalyst: isoprene : acetoacetic acid ester is generally 1 : 500–1000 : 500–1000. Suitable solvents include, for example, primary alcohols such as methanol or ethanol, pyridine and tertiary amines such as triethyl amine. Pyridine is especially preferred. The reaction temperature is about 30° to 150°C, preferably about 70° to 80°C, and the reaction time which brings about good results is 2 to 24 hours, especially 10 to 13 hours.

The following Examples are given to illustrate the invention in greater detail. Unless otherwise indicated, all percents and parts are by weight.

EXAMPLE 1

A 50 ml pressure ampoule was charged with 0.5 millimols of tetrakis(1-ethyl-3-methyl-3-phosphorene) .palladium in a stream of nitrogen, and with shaking, 12.5 ml of isoprene and 14 ml of methyl acetoacetate were added. Finally, 10 ml of pyridine was added, and the ampoule sealed. The reaction was performed at 75°C for 13 hours. After the reaction, the reaction product was washed with 10 ml of 6N-hydrochloride acid, neutralized with 30 ml of a 30% aqueous solution of sodium bicarbonate, extracted with ethyl ether, and concentrated and distilled to afford 13 g of a fraction boiling at 75°C/5 mmHg. The product was analyzed using gas-chromatography, IR, NMR and MAS, and identified as methyl prenylacetoacetate.

EXAMPLE 2

A 50 ml pressure bottle was charged with 0.5 millimols of tetrakis(1-methyl-3-methyl-3-phosphorene).palladium in a stream of nitrogen, and then 12.5 ml of isoprene and 14 ml of methyl acetoacetate were added. Then, the bottle was shaken and, after adding 10 ml of methanol, was sealed. The reaction was performed at 60°C for 14 hours. The reaction product was post-treated in the same manner as described in Example 1 to afford 8.5 g of methyl prenylacetoacetate.

EXAMPLE 3

A 100 ml pressure bottle was charged with 0.5 millimols of tetrakis[1-phenyl-4-(4-methyl-3-pentenyl)-3-phosphorene].palladium in a stream of nitrogen, and 25 ml of isoprene and 28 ml of methyl acetoacetate were added. After further adding 20 ml of pyridine, the bottle was sealed, and the reaction was performed at 75°C for 13 hours. The reaction product was post-treated in the same manner as described in Example 1 to afford 28 g of methyl prenylacetoacetate.

EXAMPLE 4

A 50 ml pressure ampoule was charged with 0.5 millimols of tetrakis(1-phenyl-3-methyl-3-phosphorene).palladium in a stream of nitrogen, and, after adding 12.5 ml of isoprene, 14 ml of methyl acetoacetate and 10 ml of triethyl amine, was sealed. The reaction was performed at 80°C for 8 hours. The reaction product was post-treated in the same manner as described in Example 1 to afford 9.3 g of methyl prenylacetoacetate.

EXAMPLE 5

A 50 ml pressure ampoule was charged with 0.5 millimols of (1-methyl-3-methyl-3-phosphorene)$_2$(1-ethoxy-3-methyl-3-phosphorene)$_2$.palladium in a stream of nitrogen, and, after adding 25 ml of isoprene and 28 ml of methyl acetoacetate, was sealed. The reaction was performed at 70°C for 12 hours, and the reaction product was post-treated in the same manner as described in Example 1 to afford 2.5 g of methyl prenylacetoacetate.

EXAMPLE 6

A 50 ml pressure ampoule was charged with 0.5 millimols of tetrakis(1-phenyl-2-methyl-3-phosphorene).palladium in a stream of nitrogen, and, after adding 12.5 ml of isoprene, 14 ml of methyl acetoacetate and 15 ml of pyridine, was sealed. The reaction was performed at 75°C for 13 hours, and the reaction product was post-treated in the same manner as described in Example 1 to afford 12.2 g of methyl prenylacetoacetate.

EXAMPLE 7

A 50 ml pressure ampoule was charged with 0.5 millimols of tetrakis(1-phenyl-2-phenyl-3-phosphorene).palladium in a stream of nitrogen, and, after adding 12.5 ml of isoprene, 14 ml of methyl acetoacetate and 15 ml of pyridine, was sealed. The reaction was performed at 75°C for 10 hours. The reaction product was post-treated in the same manner as described in Example 1 to afford 11.5 g of methyl prenylacetoacetate.

EXAMPLE 8

A 50 ml pressure ampoule was charged with 0.5 millimols of tetrakis(1-phenoxy-3-methyl-3-phosphorene).palladium, and, after adding 14 ml of methyl acetoacetate, 12.5 ml of isoprene and 10 ml of pyridine, was sealed. The reaction was performed at 80°C for 15 hours, and the reaction product was post-treated in the same manner as described in Example 1 to afford 10 g of methyl prenylacetoacetate.

EXAMPLE 9

A 50 ml pressure ampoule was charged with 0.5 millimols of tetrakis(1-dimethylamino-3-methyl-3-phosphorene).palladium, and, after adding 12.5 ml of isoprene and 14 ml of methylacetoacetate, was sealed. The reaction was performed at 75°C for 13 hours, and the reaction product was post-treated in the same manner as described in Example 1 to afford 13.5 g of methyl prenylacetoacetate.

While the invention has been described in detail and with reference to specific embodiments thereof, it will be apparent to one skilled in the art that various changes and modifications can be made therein without departing from the spirit and scope thereof.

What is claimed is:

1. A process for preparing 2-acetyl-5-methyl-4-hexenic acid esters, which comprises reacting isoprene with an acetoacetic acid ester in the presence of a zero-valent palladium-phosphorene complex having the formula

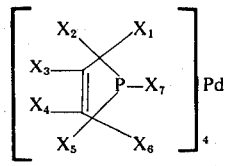

wherein each of $X_1$, $X_2$, $X_3$, $X_4$, $X_5$ and $X_6$ is a hydrogen atom or an alkyl group, an alkenyl group, or a phenyl group, $X_7$ is an alkyl group, an alkenyl group, a phenyl or para-tolyl group, an alkoxy group, a phenoxy group or an amino group selected from the group consisting of dimethylamino, diethylamino and diphenylamino, with the four phosphorene moieties in the above formula being the same or different, at a temperature of 30° to 150°C in an inert gas atmosphere.

2. The process of claim 1, wherein the reaction is conducted for a period of 2 to 24 hours.

3. The process of claim 1, wherein said reaction temperature is 70° to 80°C.

4. The process of claim 2, wherein said reaction time is 10 to 13 hours.

5. The process of claim 1, wherein said acetoacetic acid ester is methyl acetoacetate and ethyl acetoacetate.

6. The process of claim 1, wherein said each of $X_1$, $X_2$, $X_3$, $X_4$, $X_5$ and $X_6$ is a methyl, an ethyl, a 4-methyl-3-pentenyl or a phenyl group and wherein $X_7$ is a methyl, an ethyl, an allyl, a methallyl, a phenyl, a para-tolyl, an ethoxy, a butoxy, a phenoxy, a dimethylamino, a diethylamino or a diphenylamino group.

7. The process of claim 1, wherein said process is conducted in an inert solvent.

8. The process of claim 7, wherein said solvent is a primary alcohol, a tertiary amine, or pyridine.

9. The process of claim 8, wherein said solvent is pyridine.

10. The process of claim 1, wherein said zero-valent palladium-phosphorene complex is tetrakis(1-ethyl-3-methyl-3-phosphorene).palladium, tetrakis(1-methyl-3-methyl-3-phosphorene).palladium, tetrakis[1-phenyl-4-(4-methyl-3-pentenyl)-3-phosphorene].palladium, tetrakis(1-phenyl-3-methyl-3-phosphorene).palladium, (1-methyl-3-methyl-3-phosphorene)$_2$(1-ethoxy-3-methyl-3-phosphorene)$_2$.palladium, tetrakis(1-phenyl-2-phenyl-3-phosphorene).palladium, tetrakis(1-phenyl-2-phenyl-3-phosphorene).palladium, tetrakis(1-phenoxy-3-methyl-3-phosphorene).palladium or tetrakis-(1-dimethylamino-3-methyl-3-phosphorene).palladium.

11. The process of claim 1, wherein said inert gas is nitrogen or argon.

* * * * *